April 4, 1961 W. R. SMITH-VANIZ 2,978,624
MULTIPLE-FEEDBACK AMPLIFIER SERIES MOTOR CONTROL SYSTEM
Filed July 29, 1957
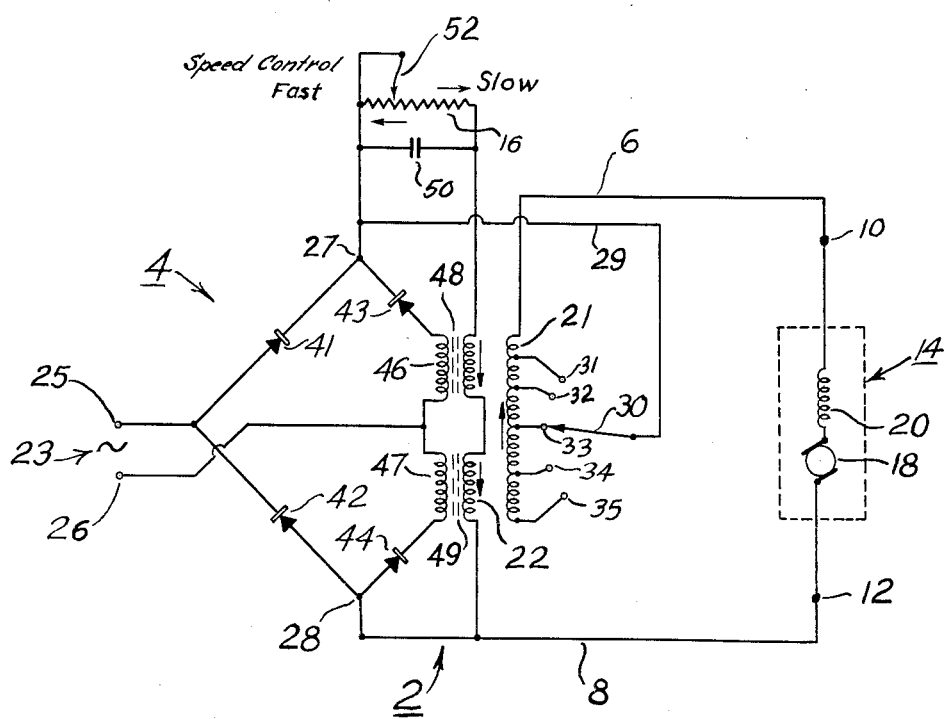
INVENTOR:
WILLIAM R. SMITH-VANIZ
BY
Curtis, Morris & Safford
ATTORNEYS:

United States Patent Office 2,978,624
Patented Apr. 4, 1961

2,978,624

MULTIPLE-FEEDBACK AMPLIFIER SERIES MOTOR CONTROL SYSTEM

William R. Smith-Vaniz, Norwalk, Conn., assignor to C.G.S. Laboratories, Inc., Stamford, Conn., a corporation of Connecticut Filed July 29, 1957, Ser. No. 674,718

5 Claims. (Cl. 318—249)

The present invention relates to a multiple-feedback amplifier motor control system and more particularly to a magnetic amplifier motor control system including positive current feedback and negative voltage feedback for controlling the speed of a series-type electric motor.

Among the many advantages of the multiple feedback amplifier motor control system of the present invention are those resulting from the fact that this system provides good speed regulation even at slow speed settings and provides smooth starting and stopping characteristics for all types of loads. This system provides a wide range in speed adjustment from full rated speed down to a small fraction of rated speed.

Advantageously, a multiple-feedback motor speed control magnetic amplifier system embodying the present invention is open-circuit stable. When the motor is connected between the output terminals, this system rapidly accelerates the controlled motor from a dead stop, attaining and holding the desired constant speed, even when used with loads having a high starting friction and a large inertia factor. Typical motor speed controls prior to the present invention are relatively complex. When operated with a motor load of the type having a high starting friction and substantial inertia, prior controls in overcoming the starting friction often produce an initial sudden burst of speed rising far above the desired value. This problem is overcome by the quick acting effective control action of the amplifier system of the present invention.

It is an object of the present invention to provide an improved motor control system which is extremely reliable and rugged in operation, has a long operating life and is economical and convenient to operate and having smooth starting and stopping characteristics and good speed regulation and which provides full rated torque output even at slow speeds.

In the illustrative embodiment of the present invention described herein, a sensitive, reliable magnetic amplifier system furnishes the control power. This amplifier system includes a positive current feedback control winding and a negative voltage feedback control winding responsive, respectively, to the magnitude of the armature current and to the voltage appearing across the motor terminals. This control amplifier causes the motor smoothly and rapidly to attain and then to hold the desired speed corresponding to the setting of a control potentiometer.

In this specification and in the accompanying drawing is described and shown an illustrative embodiment of a multiple-feedback amplifier series motor control system embodying the present invention but it is to be understood that this example is not intended to be exhaustive nor limiting of the invention, but on the contrary is set forth for purposes of illustration in order that others skilled in the art may fully understand the invention and the manner of applying the method and apparatus in practical use so that they may modify and adapt the series motor control system in various forms, each as may be best suited to the conditions of a particular motor installation.

The various objects, aspects, and advantages of the present invention will be more fully understood from a consideration of the following specification in conjunction with the accompanying drawing which is a schematic circuit diagram of a series motor speed control system embodying the present invention and including a magnetic amplifier having controlled winding means in a bridge rectifier circuit. This bridge rectifier supplies direct current to the motor being controlled and also supplies the component of direct current which is used to provide negative voltage feedback to the magnetic amplifier, and also the positive current feedback component.

This motor speed control system includes, generally, a magnetic amplifier circuit 2, a bridge rectifier circuit 4 and a pair of output connections 6 and 8 including a pair of terminals 10 and 12, respectively, adapted to have an electric motor 14 connected therebetween whose speed is controlled in accordance with the setting of a speed control potentiometer 16.

As illustrated, the motor connected between the output terminals 10 and 12, is of the so-called universal type, having an armature 18 in series with a field winding 20.

*Operation of motor control system*

A series motor is characterized by the fact that its speed decreases markedly as the output torque increases. A mechanical load applied to the series motor causes the current drawn by the motor to increase. Thus, from the point of view of the source of electrical power connected to the motor, the motor appears to be a resistor that increases in value as the speed of the motor increases, and vice versa.

This may be explained as follows:

The total voltage "E" appearing between the terminals 10 and 12 is the sum of the resistance drop plus the reverse electromotive force (E.M.F.) developed by the armature 18 as it rotates in the magnetic field created by the flow of current through the field winding 20.

(1) $$E = IR + \text{E.M.F.}$$

The back E.M.F. is proportional to the product of the magnetic field intensity "$\phi$" and the speed of rotation "$\omega$" of the armature.

(2) $$\text{E.M.F.} = k\phi\omega$$

where "$k$" is a constant of proportionality. However, because the field is in series with the armature, the field strength $\phi$ is proportional to the current. Thus, Equation 2 can be rewritten as follows:

(3) $$\text{E.M.F.} = KI\omega$$

where "$K$" is a constant of proportionality. This term can be substituted in Equation 1 above as follows:

(4) $$E = IR + KI\omega$$
$$= I(R + K\omega)$$

From this equation it is seen that the resistance of the series motor which appears at the terminals 10 and 12 equals its winding resistance plus a factor which increases directly with the r.p.m. of the motor. Electrical power is supplied to the motor through the magnetic amplifier circuit under the control of a positive feedback winding 21 which is responsive to the magnitude of the current being supplied to the motor and a negative feedback winding 22 which is responsive to the voltage appearing across the motor.

When the motor is connected between the terminals 10 and 12, the flow of current causes the positive feedback winding 21 to turn the magnetic amplifier fully "on." Thus, maximum current is supplied to the motor, and it accelerates up to the desired speed.

As the motor accelerates, its apparent resistance as expressed in Equation 4 increases so that the voltage appearing across the motor terminals progressively rises. Thus, the negative voltage feedback winding 22 begins to reduce the effective gain of the amplifier. As the motor reaches the desired speed, the gain of the amplifier is reduced effectively to unity so as to supply the proper current at the proper voltage to maintain this speed constant.

Any changes in load which tend to change the motor speed are immediately compensated for by the control action of the windings 21 and 22. By adjusting the speed control potentiometer 16 the desired speed is quickly and conveniently changed as desired.

The magnetic amplifier is open circuit stable, because any disconnection of the motor stops the action of the positive current feedback winding.

In summary of the operation, the magnetic amplifier presents a negative output impedance to the motor of a magnitude to match the effective resistance presented by the motor at the desired speed.

*Further explanation and detailed description of circuit connections*

In this control system the series motor is operated as a direct-current device, being energized from a suitable alternating-current source 23, such as a 60 cycle 115 volt source, through the bridge rectifier 4. A pair of input terminals 25 and 26 are connected from this A.-C. source to opposite sides of the bridge rectifier circuit, and the bridge output terminals 27 and 28 are connected to supply direct-current power to the motor under the control of the magnetic amplifier 2.

From the bridge output terminal 27 the circuit to one side of the motor extends through a lead 29 to a feedback selection switch including an adjustable contact arm 30 adapted to engage any one of the taps 31, 32, 33, 34, or 35 on the positive feedback control winding 21 and then through the connection 6 to the terminal 10. The other bridge output terminal 28 is connected directly through the connection 8 to the terminal 12.

In the bridge circuit, a first rectifier 41 is connected between the terminals 25 and 27 and a second rectifier 42 is connected between the terminals 25 and 28. A third rectifier 43 in series with a controlled winding 46 of the magnetic amplifier circuit is connected between the bridge terminals 26 and 27. A fourth rectifier 44 in series with another controlled winding 47 is connected between the bridge terminals 26 and 28.

From this description, it will be appreciated that the controlled windings 46 and 47 form the controlled winding means of the magnetic amplifier and which are in two arms of the bridge circuit and effectively in circuit in series with the output connections 6 and 8.

During alternate half cycles of the supply source current tends to flow through the respective controlled windings 46 and 47 to the motor. The magnitude of this current depends upon the impedance of these windings 46 and 47 as controlled by the degree of magnetic saturation of the respective associated saturable core portions 48 and 49.

The positive current feedback winding 21 is effectively in circuit in series with the output connections 6 and 8. It is associated with the core portions 48 and 49, and is arranged with respect to the controlled windings so that its magnetomotive force acts in the same direction in these core portions as that due to the controlled windings. Thus, any increase in current flowing through the positive feedback control winding 21 tends to increase further the magnitude of the current being supplied to the motor.

The negative voltage feedback winding 22 is effectively in circuit across the output connections. Actually, as shown here, it is connected across both the motor and the control winding 21, but this does not affect the applicability of Equation 4. The control winding 22 is also associated with the core portions 48 and 49 but its magnetomotive force opposes the action of any current in the controlled windings 46 and 47. As a result, any increase in voltage across the control winding 22 tends to decrease further the magnitude of the current being supplied to the motor.

In order to control the speed, the potentiometer 16 is connected to the bridge terminal 27 and in series with the control winding 22 and is shunted by a condenser 50. The purpose of this condenser is to increase the effectiveness of the negative feedback action with respect to abrupt changes in motor speed so as to increase stability of operation and so as to prevent sudden bursts in speed in overcoming static friction at starting. As the contact arm 52 is moved along the potentiometer toward the right, it progressively short circuits the potentiometer resistor. This increases the proportion of the negative-feedback voltage appearing across the control winding 22 and so establishes a lower speed of operation, and vice versa.

For the purpose of adjusting the magnetic amplifier for the optimum speed regulation for the particular motor which is being controlled, the feedback adjustment arm 30 is set in position on one of the taps 31 through 35 along the control winding 21.

In a particular system for regulating 115 v. series motors having a rating in the range from $\frac{1}{50}$ H.P. to $\frac{1}{15}$ H.P., the negative feedback winding 22 had a total of 8,000 turns and the controlled windings 46 and 47 had 2,200 turns each. The various taps on the current feedback winding respectively provided 50, 70, 100, 150, and 220 turns, and the speed control potentiometer had a resistance of 15,000 ohms.

From the foregoing it will be understood that the embodiment of the multiple-feedback magnetic amplifier series motor control system of the present invention described above is well suited to provide the advantages set forth, and since the apparatus herein described may be varied in various parts, all without departing from the scope of the invention, it is to be understood that all matter hereinbefore set forth or shown in the accompanying drawing is to be interpreted as illustrative, and that in certain instances, some of the features of the invention may be used without a corresponding use of other features, all without departing from the scope of the invention.

I claim:

1. A motor control system for a series-type motor including a bridge rectifier circuit having a pair of input terminals adapted to be connected to a source of alternating current, a magnetic amplifier having first and second controlled winding means, magnetically saturable core means and first and second control windings for controlling the saturation of said core means, first and second output connections from said bridge rectifier circuit adapted to be connected to a series-type electric motor, said first controlled winding means being in said bridge rectifier circuit in series between one of said input terminals and one of said output connections and said second controlled winding means being in said bridge rectifier circuit in series between said one input terminal and the other of said output connections for controlling the current flowing through the electric motor connected between said output connections, said first control winding also being in circuit in series with said output connections and arranged to decrease the impedance of said first and second controlled winding means in response to increase in current through said first control winding, thereby providing positive current feedback in said magnetic amplifier, said second control winding being effectively in circuit across said output connections and increasing the impedance of said first and second controlled winding means in response to increase in voltage between said output connections, thereby providing negative voltage feedback in said magnetic amplifier, and an adjustable resistor in series with said second control winding for adjusting the motor speed.

2. A motor speed control system as claimed in claim 1 and including a condenser across said adjustable resistor for increasing the negative feedback action during sudden increases in speed.

3. A multiple-feedback motor control system for a series-type electric motor, said system including a bridge rectifier circuit having first and second input terminals adapted to be connected to opposite sides of a source of alternating current, first and second output terminals, and four rectifier means, said system including variable resistance means for controlling the motor, and magnetic amplifier means having magnetically saturable core material and first and second controlled windings and first and second control windings associated with said saturable core material, the first rectifier means being connected in said bridge rectifier between said first bridge input terminal and first bridge output terminal, the second rectifier means being connected in said bridge circuit between said first bridge input terminal and said second bridge output terminal, the third rectifier means being connected in said bridge circuit in serial relationship with said first controlled winding between said second bridge input terminal and said first bridge output terminal, and the fourth rectifier means being connected in said bridge circuit in serial relationship with said second controlled winding between said second bridge input terminal and said second bridge output terminal, output circuit means extending between the first and second bridge output terminals and including a pair of motor terminals adapted to have the series-type motor connected therebetween, said output circuit means including said first control winding in serial relationship with said motor terminals for providing positive feedback so as to reduce the impedance of the controlled windings as the current increases between the motor terminals, and control circuit means in circuit across said motor terminals and including said variable resistance means in serial relationship with said second control winding for providing negative feedback so as to increase the impedance of the controlled windings as the voltage rises across said motor terminals.

4. A motor control system for a series-type electric motor, said system including a bridge rectifier circuit having first and second input terminals adapted to be connected to a source of alternating current, first and second output terminals, and four rectifier means, said system including variable resistance means for controlling the motor, and magnetic amplifier means having magnetically saturable core material and first and second controlled windings and first and second control windings associated with said saturable core material, the first rectifier means being connected in said bridge circuit between said first bridge input terminal and first bridge output terminal, the second rectifier means being connected in said bridge circuit between said first bridge input terminal and said second bridge output terminal, the third rectifier means being connected in said rectifier circuit in serial relationship with said first controlled winding between said second bridge input terminal and said first bridge output terminal, the fourth rectifier means being connected in said rectifier circuit in serial relationship with said second controlled winding between said second bridge input terminal and said second bridge output terminal, said first control winding including a plurality of taps adapted to be selectively engaged by said movable contact, output circuit means extending between the first and second bridge output terminals and including an adjustable contact and a pair of motor terminals adapted to have the series-type motor connected therebetween, said output circuit means including said first control winding in serial relationship with said adjustable contact and said motor terminals for providing positive feedback so as to reduce the impedance of the controlled windings as the current increases between the motor terminals, and second circuit means extending between said first and second bridge output terminals including said variable resistance means in serial relationship with said second control winding for providing negative feedback so as to increase the impedance of the controlled windings as the voltage rises across said motor terminals.

5. A series-motor control system including a bridge rectifier circuit having four rectifier means and first, second, third, and fourth bridge terminals, said first and third bridge terminals and said second and fourth bridge terminals being at respective diagonally opposite positions in the bridge circuit, a magnetic amplifier having first and second saturable core portions and first and second controlled windings associated with said first and second core portions, respectively, and a negative-feedback voltage control winding associated with both of said core portions and a positive-feedback current control winding also associated with both of said core portions, said first controlled winding being in said bridge circuit in series with one of said rectifier means between said first and second bridge terminals, said second controlled winding being in said bridge circuit in series with another of said rectifier means between said first bridge terminal and said fourth bridge terminal, a pair of input connections for alternating current connected to a pair of diagonally opposite bridge terminals, and an output load circuit connected to the other pair of diagonally opposite bridge terminals, said output load circuit having a pair of load terminals and including said positive-feedback current control winding in serial relation with said load terminals, and a variable resistor for controlling the speed of a series motor connected between said load terminals, said variable resistor being connected in series with said negative-feedback voltage control winding across said load terminals.

References Cited in the file of this patent

UNITED STATES PATENTS

| | | |
|---|---|---|
| 2,455,869 | Krabbe | Dec. 7, 1948 |
| 2,683,843 | Geyger | July 13, 1954 |
| 2,792,547 | Horton et al. | May 14, 1957 |
| 2,876,408 | Alexanderson | Mar. 3, 1959 |